(12) United States Patent
Nyberg

(10) Patent No.: US 6,644,704 B1
(45) Date of Patent: Nov. 11, 2003

(54) EXTENDABLE TRUCK RACK

(76) Inventor: Don Nyberg, 18101 James Rd., Villa Park, CA (US) 92861

( * ) Notice: Subject to any disclaimer, the term of this patent is extended or adjusted under 35 U.S.C. 154(b) by 0 days.

(21) Appl. No.: 10/171,275

(22) Filed: Jun. 12, 2002

(51) Int. Cl.$^7$ .................................................. B60P 3/00
(52) U.S. Cl. ......................................... 296/3; 224/405
(58) Field of Search ............................. 296/3; 224/405; 211/195, 201

(56) References Cited

U.S. PATENT DOCUMENTS

| | | | |
|---|---|---|---|
| 3,891,262 A | | 6/1975 | Brunel |
| 4,659,131 A | | 4/1987 | Flournoy, Jr. |
| 4,770,458 A | * | 9/1988 | Burke et al. |
| 5,190,337 A | | 3/1993 | McDaniel |
| 5,255,951 A | | 10/1993 | Moore, III |
| 5,303,858 A | | 4/1994 | Price |
| 5,439,152 A | | 8/1995 | Campbell |
| 5,628,540 A | | 5/1997 | James |
| 5,743,583 A | * | 4/1998 | Lowe |
| 5,743,702 A | | 4/1998 | Gunderson |
| 6,033,002 A | | 3/2000 | Clare et al. |
| 6,079,936 A | | 6/2000 | Watters |

* cited by examiner

Primary Examiner—Dennis H. Pedder
(74) Attorney, Agent, or Firm—Fulwider Patton Lee & Utecht, LLP

(57) ABSTRACT

An expandable rack for a truck bed used to transport lumber and the like is provided by a plurality of folding legs rigidly connected to an upper frame that supports the lumber. The folding legs allow the upper frame to retract completely within the truck bed compartment so as not to protrude over the edge of the truck bed side walls when not in use. Further, the configuration of the present invention provides an unobstructed truck bed in that no portion of the expandable rack except the folding legs occupy space on the truck bed floor, allowing the truck bed to be loaded without having to position the loaded materials over or around the rack. The present invention deploys easily to allow a single person to easily convert the rack from a retracted position to a deployed position.

10 Claims, 3 Drawing Sheets

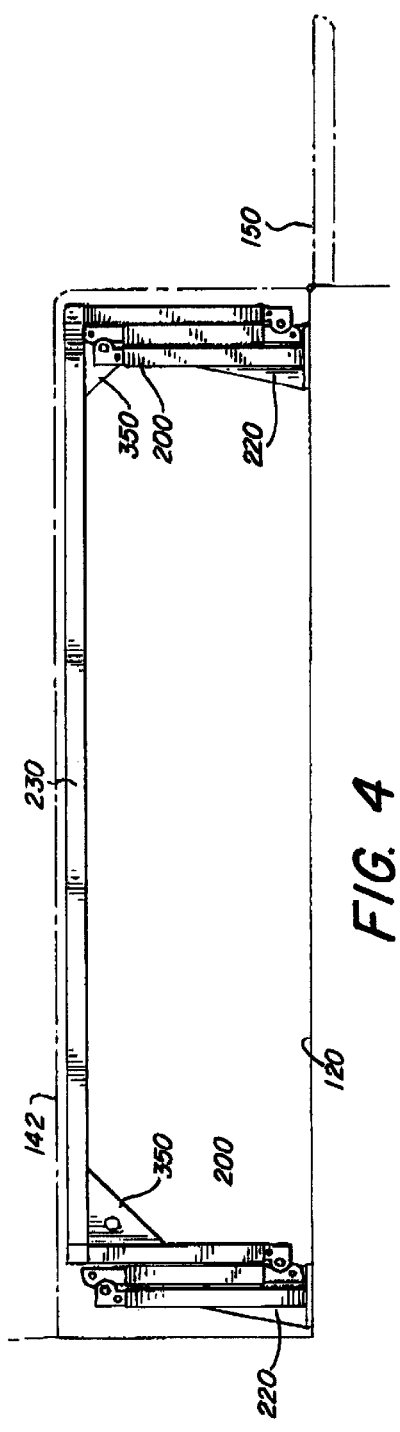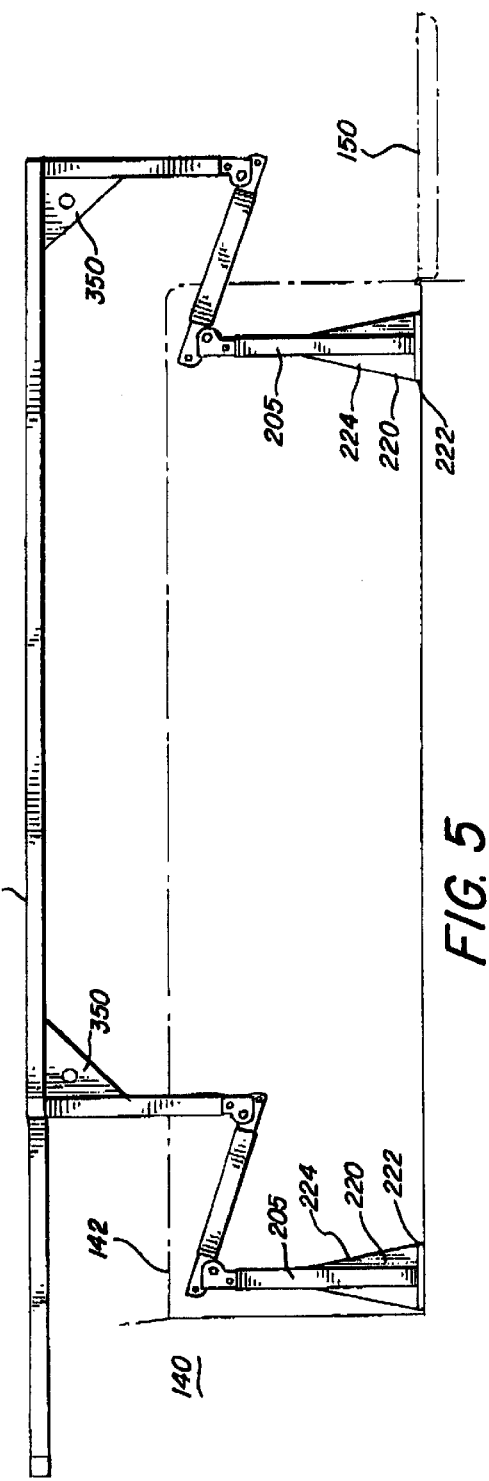

EXTENDABLE TRUCK RACK

BACKGROUND OF THE INVENTION

1. Field of the Invention

The present invention relates generally to racks mountable on a vehicle's exterior, and more particularly to a rack adapted to secure to a pick-up truck bed for carrying lumber and other oversized materials.

2. Description of the Related Art

It is well known to provide a lumber rack for a pick-up truck to carry lumber, piping, wall boards, and a multitude of construction materials and other elongate objects. Many of the prior art racks are arranged in a fixed configuration so as to be permanently mounted above the truck bed. However, when the rack is not in use, it is usually desirable to retract the rack so that it is hidden inside the truck bed where it can be used in combination with a soft or hard truck bed cover. Accordingly, a number of prior art lumber racks retract when not in use by collapsing in one form or another. However, when retracted the lumber racks of the prior art typically rests on or across the truck bed, such as in a specially provided storage compartment on the truck bed floor, resting in its collapsed state on the floor of the truck bed, or seated on the top of the truck bed rails viewable from the side. Where the retracted lumber rack occupies a position across the floor of the truck bed then it may be very difficult to load a heavy object into the truck bed since the rack will be in the way. Moreover, if a special storage compartment is used then the amount of cargo space in the truck bed is diminished appreciably. Thus, when the rack is retracted into a hidden configuration it is desirable to maintain the truck bed clear of the rack or special storage compartments so that the bed may be used more efficiently for carrying other objects.

Also, it has been discovered by the present inventor that the use of telescoping members to extend and retract the rack can present reliability problems and cause premature wear. That is, the environment of the truck bed is such that dirt, sand, and other granular particles can be lodged between the telescoping members making it difficult to raise and lower the rack. If only one person is attempting to deploy the rack, the resistance in the telescoping poles due to the embedded particles can cause the rack to twist, bend, warp, and bind leading to possible eventual failure of the rack. Accordingly, a reliable deployment of the rack that is less susceptible to the introduction of sand or dirt is needed in the art. Finally, the ability of a lone person to easily and quickly deploy the rack without the rack bending or twisting is a feature not found among the prior art truck racks.

SUMMARY OF THE INVENTION

The present invention comprises a truck rack that maintains an unobstructed path into and out of the truck bed when the rack is retracted in a hidden configuration. The hidden configuration preferably completely conceals the rack from view when the truck is viewed from the level of the truck bed side walls, and can be deployed from a hidden configuration to a deployed configuration easily and reliably by a single person. The truck rack of the present invention includes a reliable deployment mechanism comprising legs having rigid members connected by hinges that allow the rigid members to fold upon themselves rather than telescope. The folding leg members are preferably rigidly mounted to an upper frame that is concealed within the sides of the truck bed when the rack is retracted, and extends above the truck cabin when deployed. With the upper frame hidden within the sides of the truck bed in the retracted position, the floor of the truck bed is clear of the rack with the exception of the four legs located at each corner of the truck bed. The absence of any obstruction across the truck bed floor permits easy loading and unloading without the need to lift objects over the retracted rack.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIGS. 4 and 5 are side views of the preferred embodiment of FIG. 1 showing the retracted mode (FIG. 4) and a partially deployed mode (FIG. 5)

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an extendable rack and frame for a pick-up truck bed.

Figure 1:
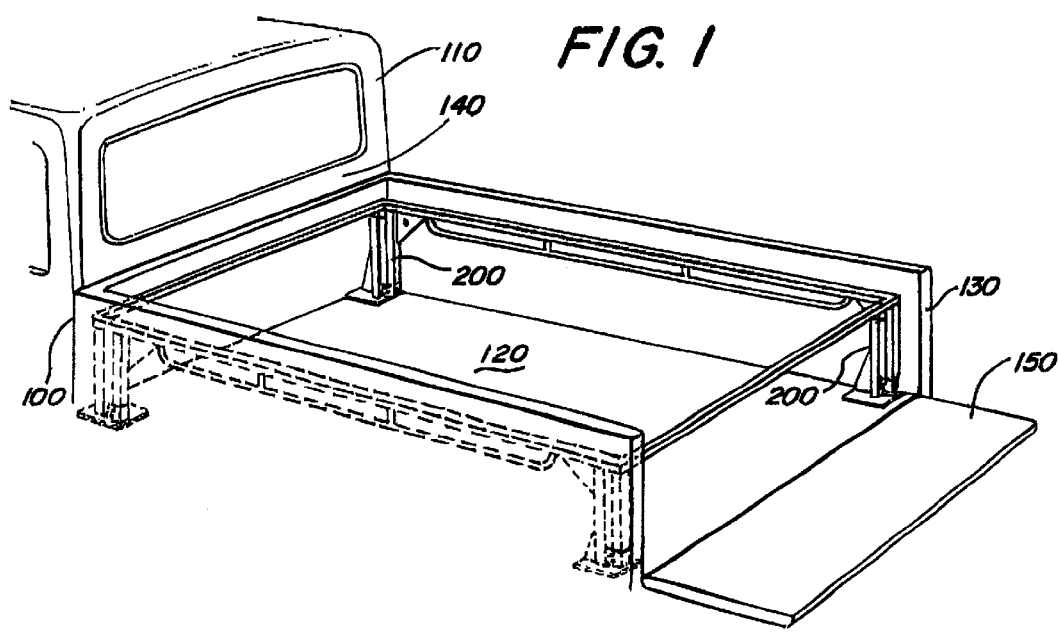
FIG. 1 is an elevated perspective view of a preferred embodiment of the present invention showing a truck bed with the extendable rack of the present invention in retracted mode.
Figure 2:
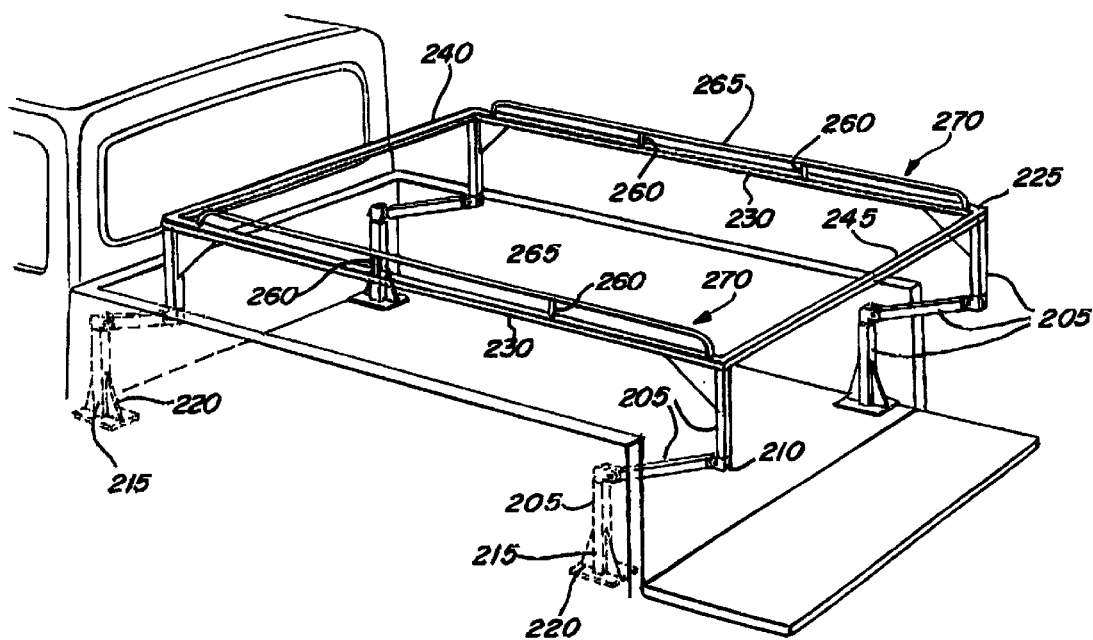
FIG. 2 is an elevated perspective view of the preferred embodiment of the present invention of FIG. 1 showing the extendable rack in a partially deployed mode.
Figure 3:
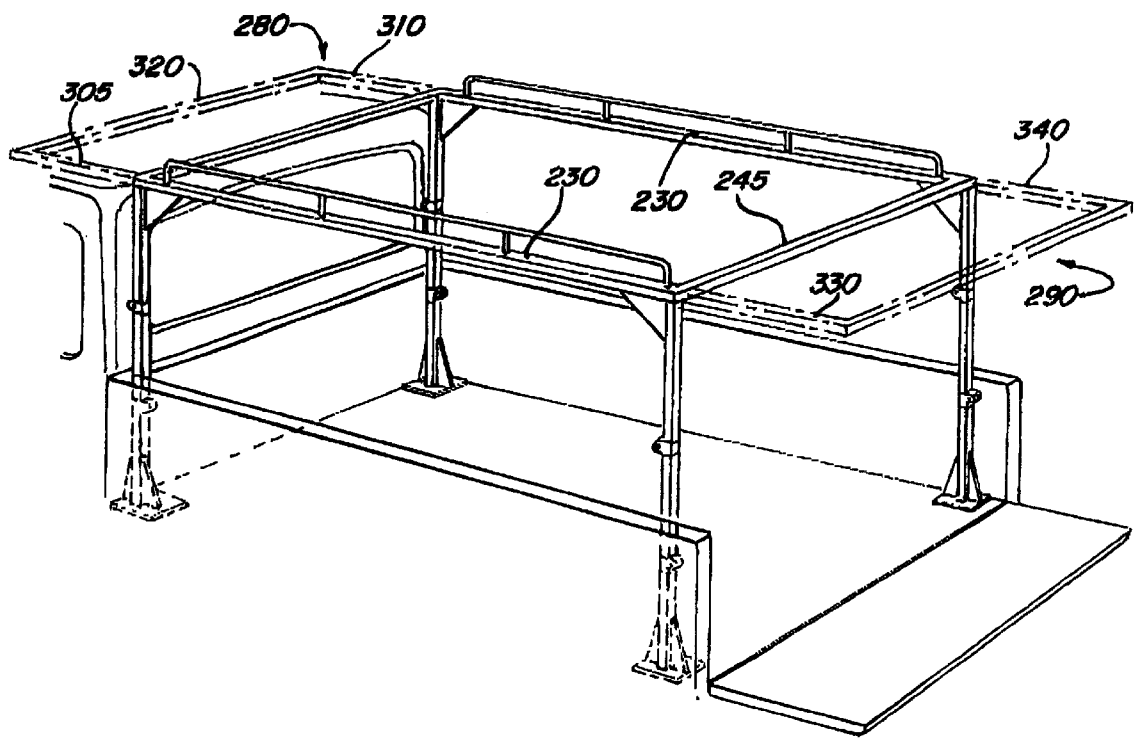
FIG. 3 is an elevated perspective view of the preferred embodiment of the present invention of FIG. 1 showing the extendable rack in a fully deployed mode.

FIGS. 1–3 illustrate a first preferred embodiment of the present invention providing an extendable rack adapted to be mounted to the back of a pick-up truck. The rack is preferably made of aluminum, but steel or other materials can be substituted without departing from the scope of the invention. For reference, the truck 100 comprises a truck cab 110, a truck bed 120, truck bed side walls 130, a truck bed forward wall 140, and a tail gate 150. The elements of the truck 100 are well known in the art and form no part of the present invention. Mounted in the four corners of the truck bed 120 are folding legs 200 comprising three rigid elements 205 coupled together by hinges 210 that permit connected pairs of rigid elements 205 to fold with respect one another as shown in FIGS. 1 and 4. The bottom 215 of each folding leg 200 is mounted to the bed 120 of the truck 100 using a bracket 220 for support, where the bracket 220 is preferably fixed to the truck bed 120 floor using a welding operation, although other means for mounting the legs such as bolts or rivets can be substituted. Mounted on the top of each folding leg 200 is an upper frame 225 having longitudinal side beams 230 and traverse front and rear beams 240, 245 interconnected to form a rigid, orthogonal platform that constitutes the frame 225. The frame 225 can support a variety of objects loaded thereon, especially lumber.

The longitudinal side beams 230 preferably include a plurality of spaced apart vertical ribs 260 connected at their respective upper ends by a horizontal bar 265 to form left and right guides 270 to the frame 225 as shown in FIGS. 1–3. The guides 270 are sized to keep the rack hidden within the truck bed compartment (i.e., below the truck bed side walls) when the rack is in the retracted position, but of sufficient height to provide a barrier for cargo loaded on the frame 225 in the deployed position. The guides preferably depend downward from the longitudinal rails in the retracted position so that the rigid segments 205 of the legs 200 can be made longer without the frame 225 extending over the truck bed compartment in the retracted position. The guides can be switched from the downward projecting position to the upward projecting position as shown in FIGS. 2 and 3 by fasteners that pass through holes in the longitudinal side beams 230. Placing holes on the upper and lower surfaces allow the guide member positions to be interchangeable, such that a user can move the guide members to the upright position upon deploying the rack from its retracted position.

Nested within the longitudinal side beams 230 at each end is a front extension 280 and rear extension 290 to the frame 225. The front extension 280 is constructed of left and right extending rods 305, 310 that nest into the longitudinal side beams 230 of the frame 225 when not in use, and project forward of the traverse front beam 240 to extend the frame 225 over the truck cab 110 (FIG. 3). The extending rods 305, 310 of the front extension 280 are connected at a distal end by a front cross bar 320, extending the frame 225 to the front cross bar 320 in a common plane. Similarly, the rear extension 290 is constructed of left and right extending rods 330, 340 that also withdraw into the longitudinal side beams 230 at the aft end when not in use, and project rearward of the traverse rear beam 245 to extend the frame 225 beyond the back end of the truck bed 120 in a common plane.

In a preferred embodiment as shown in FIGS. 4 and 5, the juncture between the foldable legs 200 and the longitudinal side beams 230 is fortified by diagonal supports 350. The supports 350 can be welded to the outside edges of the uppermost rigid segment 205 of the folding legs 200 and the frame 225 in a permanent arrangement so as not to cause interference with the folding operation. At the base of the folding legs 200 preferably are brackets 220 that mount the bottom of the folding legs 200 to the to the truck bed 120. The brackets 220 comprise a flat horizontal base 222 that receives the bottom of the lowermost rigid element 205 of the folding legs 200 and a vertically projecting triangular wall 224 that is attached to the lowermost rigid member 205 of the folding leg 200 to provide added support and rigidity to the rack.

Figure 6:
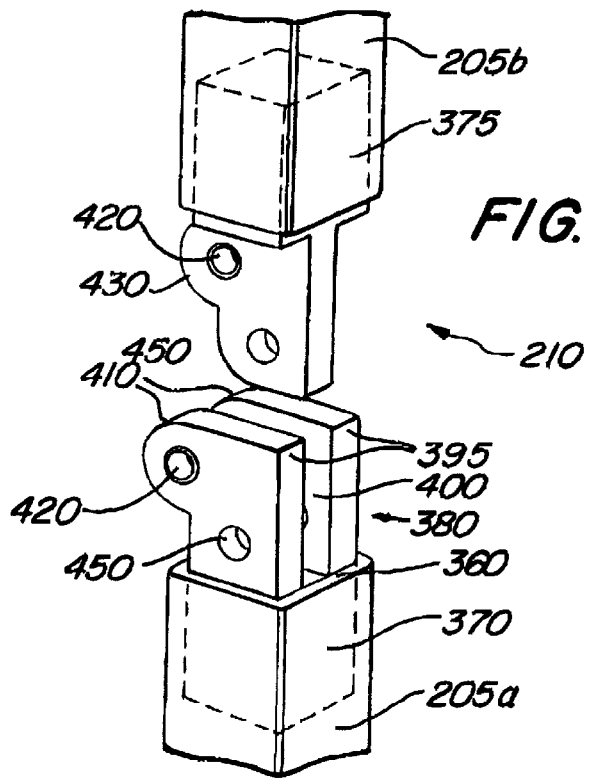
FIG. 6 is a close-up elevated perspective view of a preferred hinge mechanism for joining the rigid members of the legs.

To allow the folding legs to function as described, a hinge assembly is provided as shown in FIG. 6. The folding legs 200 are comprised of individual segments 205a,b of square tubing having a hollow interior and defining rigid members. For a pair of connected hollow rigid members shown, the lower connected hollow rigid member 205a includes a first open end 360 into which a solid square base 370 of a first hinge component 380 is fixed using a fastener (not shown) inserted into the aperture. Similarly, the upper connected hollow rigid member 205b includes a first open end into which a solid square base 375 of the second hinge component is fixed using a fastener (not shown) inserted into the aperture. The first hinge component includes a pair of spaced apart parallel plates 395 defining a channel 400 therebetween. Each plate 395 is substantially rectangular in profile with a circular projection 410 depending therefrom for sufficient strength about the shaft bearings. The shaft bearing through holes 420 includes a shaft (not shown) that facilitates rotation of the plates about the shaft. The second hinge component includes a middle plate 430 positioned to occupy the channel 400 when the first and second hinge components are brought into engagement with each other in a sandwiched configuration. The tolerances and spacing between the plates are preferably such that no relative rotation between the two hinge members can occur when the middle plate 430 is disposed between the two outer plates 410. A pair of holes are provided in each plate, where a first hole is vertically and horizontally offset from the second hole. The holes 450 are aligned on each plate 410, 430 to provide a passage for a removable pin (not shown) in the first set of holes and a fixed shaft disposed in the second set of holes 420.

With the removable pin disposed in the first set of holes 450 through the three plates and the shaft fixed in the second set of holes 420, the juncture between the upper rigid member 205b and the lower rigid member 205a is fixed and locked in an end-to-end relationship. This configuration would be used when the rack is deployed and the folding legs 200 are completely extended as shown in FIG. 3. However, if the removable pin is taken out of the first set of holes 450 then the upper rigid member 205a and lower rigid member 205b can pivot with respect to each other about the shaft. If the upper rigid member 205b is rotated one hundred eighty degrees with respect to the lower rigid member 205a the individual segments are disposed in a side-by-side arrangement and the required folding relationship is established for the present invention.

As can be seen in FIG. 5, the front two folding legs and the rear two folding legs rotate initially in a direction away from the truck cab 140 in unison as the rack is deployed or retracted. The rigid connection of the four folding legs 200 with the upper frame 225 precludes the separate legs 200 from opening in all but the same direction and at the same time. The positioning of the forward pair of folding legs 200 with the truck cab 140 and the truck bed side walls 130 precludes the folding legs 200 from opening sideways or forward, leaving only the unison folding of the folding legs in the rearward direction. Only with the tail gate 150 down can the rack be folded up or down as the rear folding leg members rotate rearward initially. Since all of the folding legs are connected to the frame 225 and raise and lower in unison, a single person can raise or lower the rack easily by grasping the frame 225 and rotating it upward or downward into position.

To deploy the frame from its retracted configuration, the removable pins are withdrawn from the folding legs 200 and the rigid members 205 are unfolded to an end-to-end configuration as shown in FIG. 3. The removable pins are inserted into each hinge assembly to lock the folding legs 200 in the end-to-end arrangement. The tailgate 150 can be closed, and the front and rear extensions 280, 290 can be extracted from their nested position within the longitudinal side beams 230 to increase the usable area of the frame 225. The right and left guides 270 provide barriers for lumber or other materials and prevent the lumber from slipping or twisting, as well as providing a suitable anchor for a tie-down strap or cable. The lumber or other cargo can be loaded onto the frame 225 and extensions 280, 290 if necessary. To retract the rack, the extensions 280, 290 are reinserted into the longitudinal side beams 230 and the removable pins are removed. With the tailgate 150 down, the frame 225 is lowered and rotated until the rigid members 205 are folded into a side-by-side relationship as shown in FIGS. 1 and 4. As can be seen in FIGS. 1 and 4, the rack is completely contained within the pick-up bed compartment between the pick-up bed side walls 140 and beneath the upper edge 142 of the pick-up bed side walls 140 to conceal the rack from view. Moreover, as can readily be appreciated the floor 120 of the pick-up bed is completely free of any obstruction from the rack in the retracted position, as only the four corners where the folding leg/bracket/truck bed interface are occupied by the rack. When loading the pick-up it is of significant importance that the rack not take up much space on the truck bed so that other materials may occupy the space, and the present invention achieves this object using the embodiment described above.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An expandable rack for mounting in the bed of a pick-up truck having a pick-up bed compartment defined by pick-up bed side walls, pick-up bed floor, and tail gate, the expandable rack comprising:

a plurality of folding legs each having at least three rigid segments connected by a hinge assembly such that each rigid segment of the folding legs collapse to a side-by-side arrangement in a retracted position and an end-to-end arrangement in a deployed position; and an upper frame mounted on upper ends of the folding legs, said upper frame completely disposed within the pick-up bed compartment when the folding legs are in the retracted position and said upper frame disposed above the pick-up bed compartment when the folding legs are in the deployed position, and where no folding leg is linked to another folding leg except through the connection with the upper frame;

wherein the rack does not occupy any space on the truck bed floor in the retracted or deployed positions except for the space occupied by the folding legs.

2. The expandable rack of claim 1 further comprising a front extension for the upper frame, said front extension including first and second projecting bars connected to the upper frame and a cross member connecting the first and second projecting bars, where the front extension extends forward in a common plane with the upper frame.

3. The expandable rack of claim 1 further comprising a rear extension for the upper frame, said rear extension including first and second projecting bars connected to the upper frame and a cross member connecting the first and second projecting bars, where the rear extension extends rearward in a common plane with the upper frame.

4. The expandable rack of claim 1 further comprising a diagonal support member connecting the upper frame with each folding leg.

5. The expandable rack of claim 1 further comprising left and right guides on the upper frame, the guides being interchangeable from an upright position to a downward position.

6. The expandable rack of claim 1 wherein the plurality of folding legs each rotate away from a truck cabin.

7. The expandable rack of claim 1 further comprising a bracket for mounting each of the folding legs, the bracket having a horizontal plate and a vertical wall wherein the folding leg is rigidly connected to both the horizontal plate and the vertical wall.

8. The expandable rack of claim 1 wherein the hinge assembly comprises:

a first hinge element having a pair of spaced apart plates;

a second hinge element having a plate aligned to rotate in between the spaced apart plates of the first hinge element;

a common shaft passing through said first and second hinge elements, the first and second hinge elements pivoting respectively about the common shaft; and a removable locking pin passing through the first and second hinge elements at an aligned pin hole in the first and second hinge members.

9. The expandable rack of claim 8 wherein the aligned pin holes are vertically and horizontally offset from the common shaft.

10. The expandable rack of claim 1 wherein each folding leg comprises exactly three rigid segments and two hinge assemblies.

* * * * *